(12) United States Patent
Lady

(10) Patent No.: US 7,387,087 B2
(45) Date of Patent: Jun. 17, 2008

(54) ANIMAL TRAINING APPARATUS

(75) Inventor: Linda J. Lady, Fremont, CA (US)

(73) Assignee: Linda Lady, Union City, CA (US)

( * ) Notice: Subject to any disclaimer, the term of this patent is extended or adjusted under 35 U.S.C. 154(b) by 0 days.

(21) Appl. No.: 11/456,821

(22) Filed: Jul. 11, 2006

(65) Prior Publication Data

US 2006/0243220 A1    Nov. 2, 2006

Related U.S. Application Data

(63) Continuation of application No. 10/341,930, filed on Jan. 14, 2003, now Pat. No. 7,107,939.

(60) Provisional application No. 60/392,746, filed on Jun. 27, 2002.

(51) Int. Cl.
*A01K 15/02* (2006.01)

(52) U.S. Cl. .................. 119/792; 119/856; 119/907; 119/905

(58) Field of Classification Search ............... 119/792, 119/793, 794, 786, 787, 788, 77, 771, 856, 119/863, 864, 905, 907; 54/71
See application file for complete search history.

(56) References Cited

U.S. PATENT DOCUMENTS

| | | | | |
|---|---|---|---|---|
| 1,685,435 A * | 9/1928 | Philbrick | ............... | 119/856 |
| 2,026,383 A * | 12/1935 | Gyulay | ............... | 119/863 |
| 2,778,335 A * | 1/1957 | Hirsch | ............... | 119/793 |
| 3,768,445 A * | 10/1973 | Sorrels | ............... | 119/856 |
| 3,769,939 A * | 11/1973 | Wais et al. | ............... | 119/856 |
| 4,667,624 A * | 5/1987 | Smith | ............... | 119/770 |
| 4,676,198 A * | 6/1987 | Murray | ............... | 119/771 |
| 4,838,206 A * | 6/1989 | Anderson et al. | ............... | 119/831 |
| 5,038,717 A * | 8/1991 | Bent | ............... | 119/815 |
| 5,199,383 A * | 4/1993 | Lagana | ............... | 119/858 |
| 5,243,931 A * | 9/1993 | McDonough | ............... | 119/671 |
| 5,247,905 A * | 9/1993 | Arakawa | ............... | 119/863 |
| 5,325,819 A * | 7/1994 | Krauss | ............... | 119/792 |
| 5,329,885 A * | 7/1994 | Sporn | ............... | 119/864 |
| 5,383,426 A * | 1/1995 | Krauss | ............... | 119/793 |
| 5,433,688 A * | 7/1995 | Davies | ............... | 482/124 |
| 5,511,515 A * | 4/1996 | Brown et al. | ............... | 119/771 |
| 5,676,093 A * | 10/1997 | Sporn | ............... | 119/792 |
| 5,724,920 A * | 3/1998 | Meisman et al. | ............... | 119/771 |
| 5,842,444 A * | 12/1998 | Perrulli | ............... | 119/770 |
| 5,893,339 A * | 4/1999 | Liu | ............... | 119/792 |
| 5,896,831 A * | 4/1999 | Alpert | ............... | 119/856 |
| 5,937,794 A * | 8/1999 | Hediger | ............... | 119/856 |

(Continued)

*Primary Examiner*—Yvonne R. Abbott
(74) *Attorney, Agent, or Firm*—Carr & Ferrell LLP

(57) ABSTRACT

An animal training apparatus is comprised of a leash connector attached to a chest portion of a harness. The harness is arranged to prevent the leash connector from shifting to the back of the animal. The harness is preferably comprised of a chest strap for positioning across the chest of the animal between the tops of the front legs, a withers strap for positioning across the withers of the animal behind the neck and between the shoulders, and a girth strap for positioning across the girth of the animal behind the front legs on the underside. The leash connector is attached to an intermediate position on the chest strap for pulling on the chest portion of the harness. The animal is prevented by the rotational force from pulling further.

45 Claims, 8 Drawing Sheets

U.S. PATENT DOCUMENTS

| | | | |
|---|---|---|---|
| 6,085,694 A * | 7/2000 | Simon | 119/792 |
| 6,095,094 A * | 8/2000 | Phillips | 119/792 |
| D434,535 S * | 11/2000 | Koch | D30/152 |
| 6,167,844 B1 * | 1/2001 | Cantrell et al. | 119/856 |
| 6,314,915 B1 * | 11/2001 | Pope et al. | 119/712 |
| 6,371,056 B1 * | 4/2002 | Phillips | 119/793 |
| 6,374,778 B1 * | 4/2002 | Glussich | 119/859 |
| 6,450,129 B1 * | 9/2002 | Flynn | 119/770 |
| 6,450,130 B1 * | 9/2002 | Goldberg | 119/792 |
| 6,662,753 B1 * | 12/2003 | Sporn | 119/797 |
| 6,694,923 B1 * | 2/2004 | Fouche | 119/792 |
| 6,773,366 B2 * | 8/2004 | Gray | 473/458 |
| D511,596 S * | 11/2005 | Mugford | D30/152 |
| 6,984,184 B2 * | 1/2006 | Gray | 473/458 |
| 2005/0009647 A1 * | 1/2005 | Gray | 473/458 |
| 2006/0102102 A1 * | 5/2006 | Bennett et al. | 119/792 |

* cited by examiner

ANIMAL TRAINING APPARATUS

I. CROSS-REFERENCE TO RELATED APPLICATIONS

This application is a continuation of, and claims the priority benefit of, U.S. patent application Ser. No. 10/341,930 filed Jan. 14, 2003 now U.S. Pat. No. 7,107,939. This application further claims priority benefit of the provisional U.S. Patent Application No. 60/392,746 filed Jun. 27, 2002.

II. BACKGROUND OF THE INVENTION

A. Field of the Invention

The invention broadly relates to animal harnesses and leashes.

B. Prior Art

An animal leash is typically connected to a collar worn around the neck of an animal. The collar is free to rotate around the neck. An animal, such as a dog, that has not been trained, instinctively wishes to roam away from its handler. When the dog tries to walk or run away and pulls the leash taut, the collar is automatically rotated so that the leash is positioned at the back of the neck. As the dog pulls the leash taut, it feels pressure on the front of its neck.

Many types of animals have an opposition reflex that makes them instinctively move toward the part of their bodies on which they feel pressure. Since the dog feels pressure at the front part of the collar when he pulls on a leash that has been rotated to the back, the collar encourages the dog to pull away from its handler with even greater force. As another example, the opposition reflex of a horse causes it to turn towards the side where the rider's leg applies pressure.

In addition to collars, there are animal harnesses that wrap around the torso. A typical harness has a leash attachment at the back of the animal, but a back-mounted leash cannot be used to give the animal cues for learning commands such as sit, down, and come. The back-mounted leash also signals the animal to pull on the leash, similar to a neck collar, because of the pressure on the front of the chest when the animals pulls the leash taut. Some prior art harnesses discourage pulling behavior by providing devices that rub, chafe, or hobble the animal's front legs, but these devices cause stress and discomfort.

III. BRIEF SUMMARY OF THE INVENTION

Accordingly, the objects of the present animal training apparatus and method are:

to prevent an animal from pulling on its leash;
to facilitate applying turning signals to the animal;
to give an animal cues for learning commands such as sit, down, and come;
to be adjustable for fitting different size animals;
to be comfortable to wear;
to not rub the armpits or forearms; and
to enable the animal to walk freely without hobbling its movements.

The present invention is an animal training apparatus that is comprised of a leash connector attached to a chest portion of a harness. The harness is arranged for preventing the leash connector from shifting to the back of the animal.

The harness is preferably comprised of a chest strap for positioning across the chest of the animal between the tops of the front legs, a withers strap for positioning across the withers of the animal behind the neck and between the shoulders, and a girth strap for positioning across the girth of the animal behind the front legs on the underside.

The leash connector is attached to an intermediate position on the chest strap for controlling an animal by pulling the chest strap in the appropriate direction. For example, it can apply a rotating force to the animal when the animal moves forwards of the handler and pulls on the leash connector. The animal is prevented by the rotational force from pulling further.

By this design, when the animal brings the leash taut, it is not encouraged to pull further by pressure on the chest, but is instead turned by pressure on the sides, thereby discouraging pulling.

IV. BRIEF DESCRIPTION OF THE DRAWINGS

V. DETAILED DESCRIPTION OF THE INVENTION

Figure 1A:
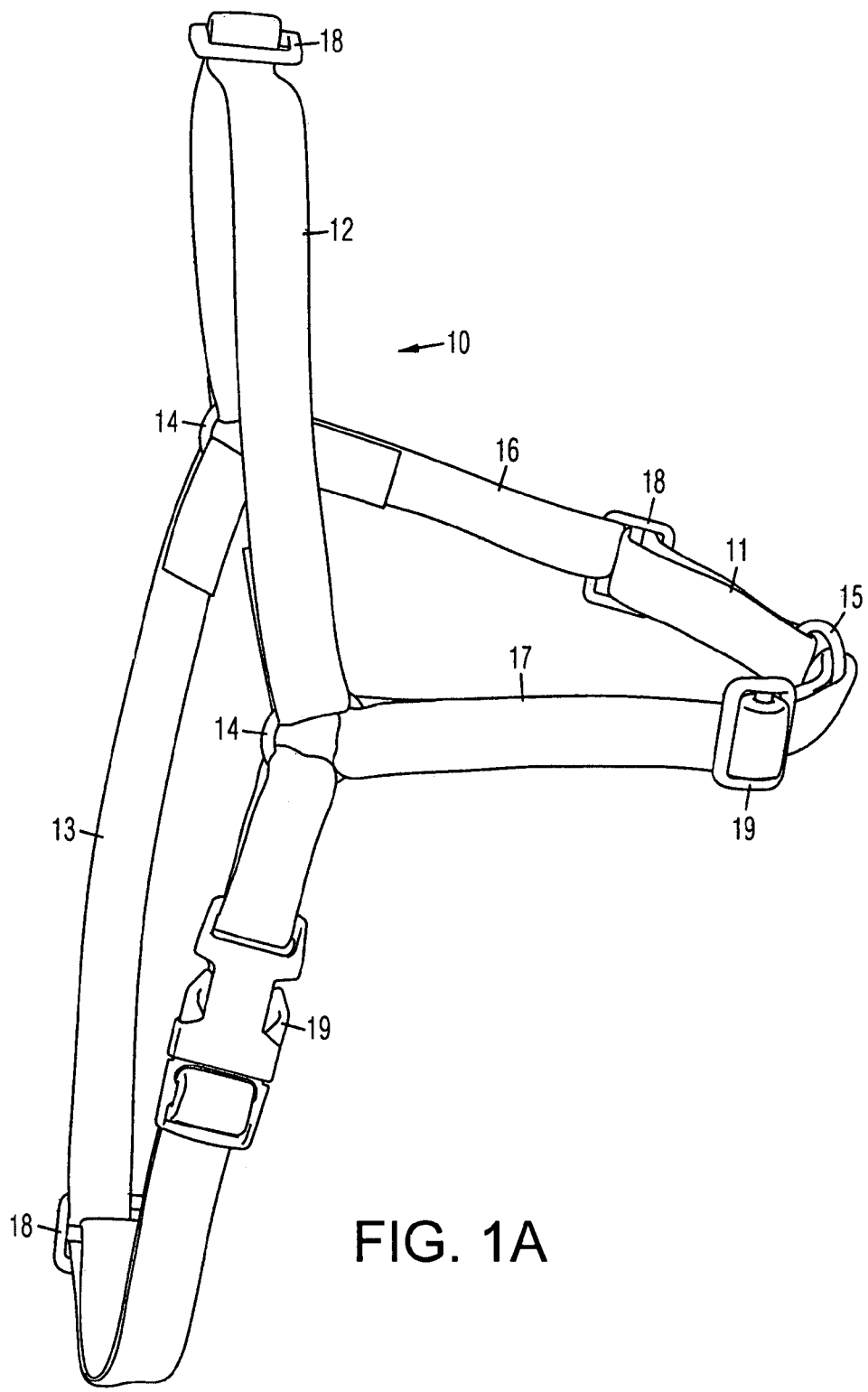
FIG. 1A is a side perspective view of the present invention.
Figure 1B:
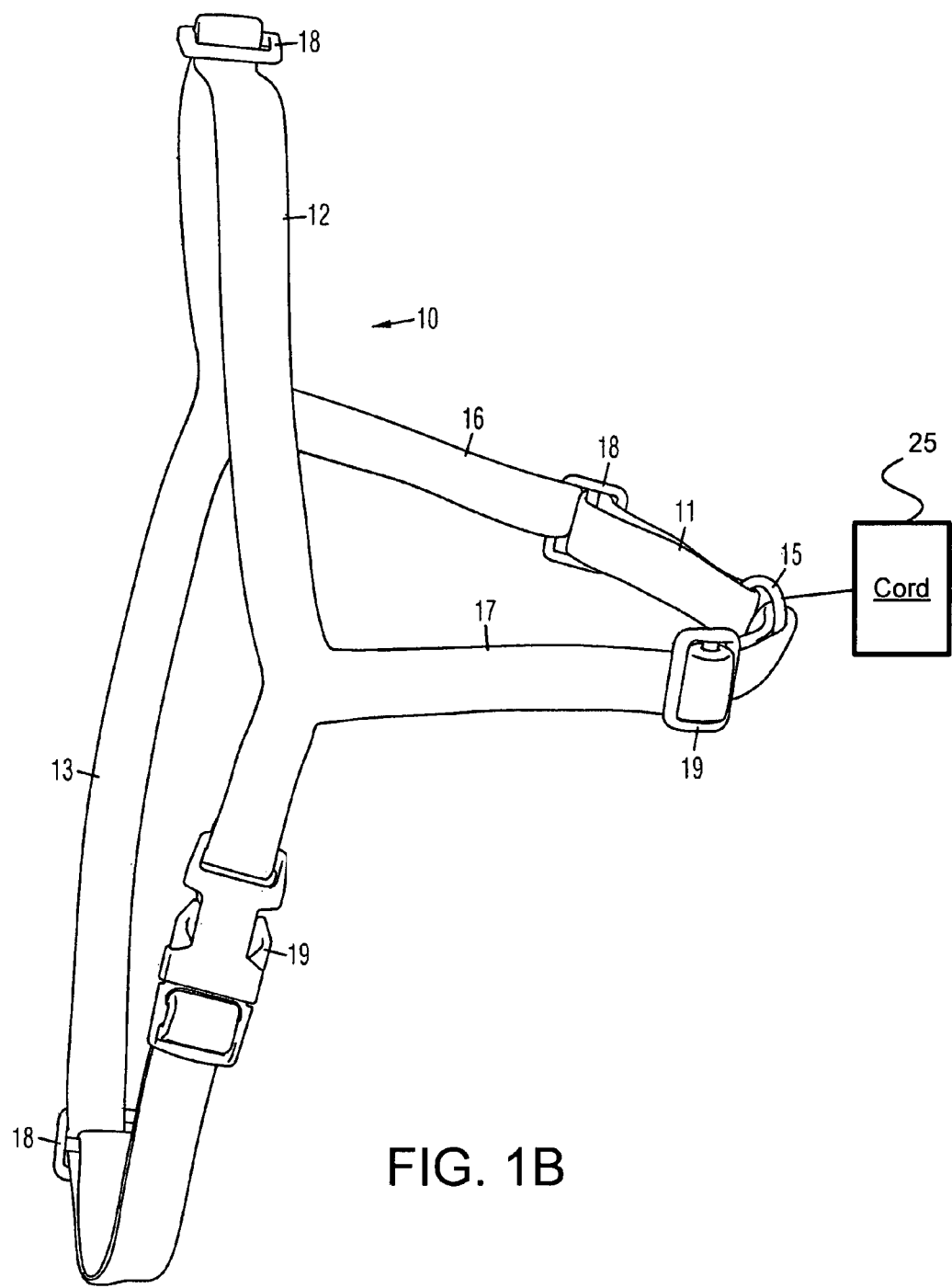
FIG. 1B is a side perspective view of an alternative embodiment of the present invention.

In accordance with a first embodiment of the invention shown in the front view of FIG. 1A, an animal harness (10) is comprised of a chest strap (11), a withers strap (12), and a girth strap (13), which are preferably made of webbing. Adjacent ends of the straps (11-13) are connected together, preferably by side connectors (14), which are preferably comprised of rings that allow the chest strap (11) to pivot up and down. Alternatively, the ends of the straps (11-13) may be connected together as illustrated in FIG. 1B without a connector, such as by sewing, gluing, or other means, or they may be integrally connected to each other.

A leash connector (15) is attached to an intermediate position on the chest strap (11). In this example, the chest strap (11) is comprised of a left strap (16) and a right strap (17) connected by the leash connector (15), which is comprised of a ring. Alternatively, the chest strap (11) may be comprised of a single strap, and the leash connector (15) may be attached to an intermediate position or any other position on the single strap. Also, the leash connector (15) may be any suitable type of connector for connecting to a leash. There may be a plurality of leash connectors on the chest strap (11).

The withers strap (12) and the girth strap (13) each includes at least one length adjuster (18), such as a slide buckle, for adjusting its length to fit different size animals. The chest strap (11) preferably includes two width adjusters (18) on either side of the leash connector (15), so as to enable adjusting the length of the chest strap (11), and preferably maintaining the leash connector (15) generally centered along the chest strap (11). Alternatively, the length adjusters (18) may be eliminated and the straps (11-13) may be sized to fit an animal of a predetermined size.

A releasable connector (19) is attached along one of the straps (11-13), preferably a girth strap (13). An identification tag (not shown) or a cord (25) illustrated in FIG. 1B) may be attached to the leash connector (15) for connecting a leash.

Figure 2:
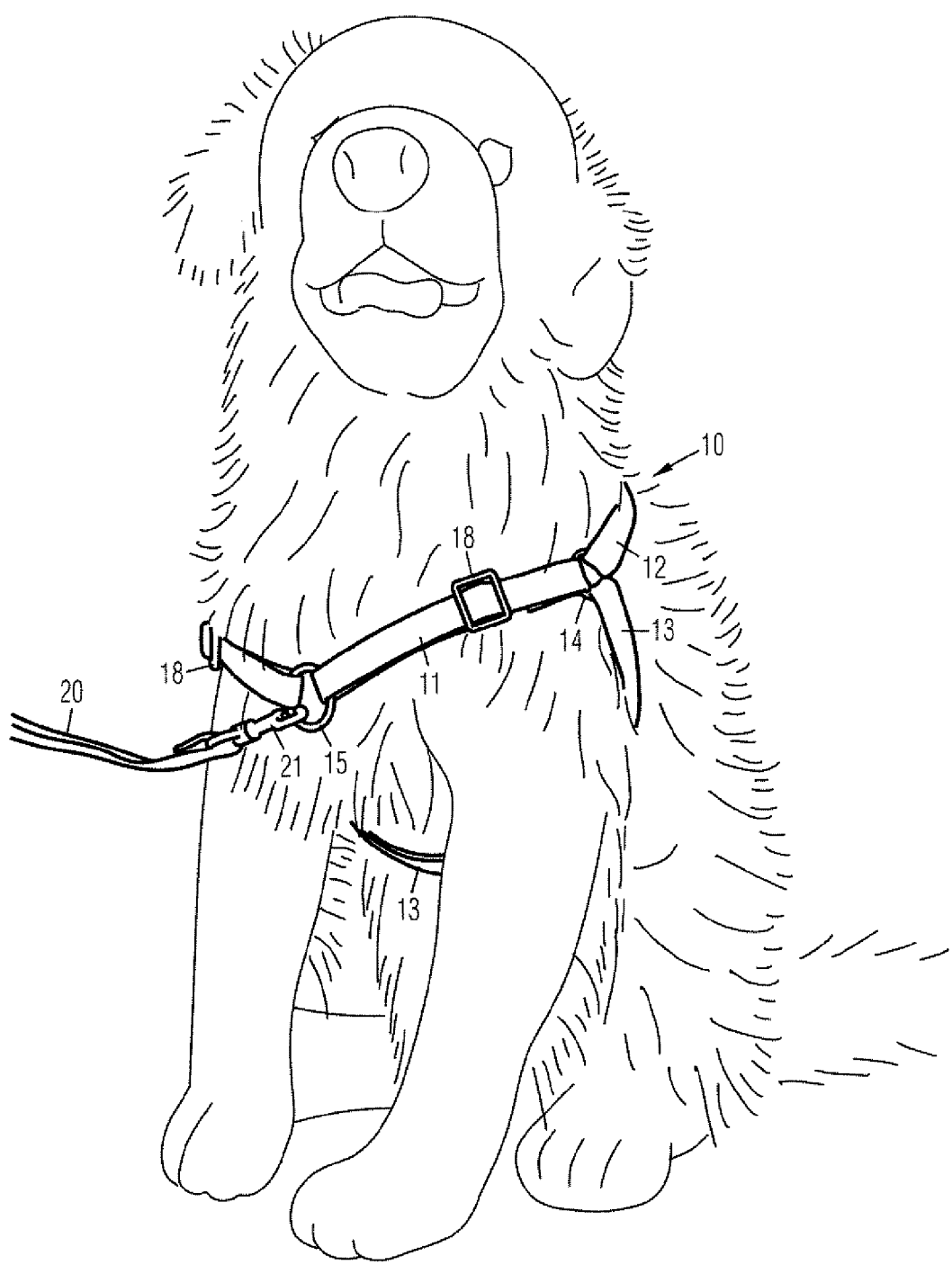
FIG. 2 is a front perspective view of the invention on an animal.
Figure 3:
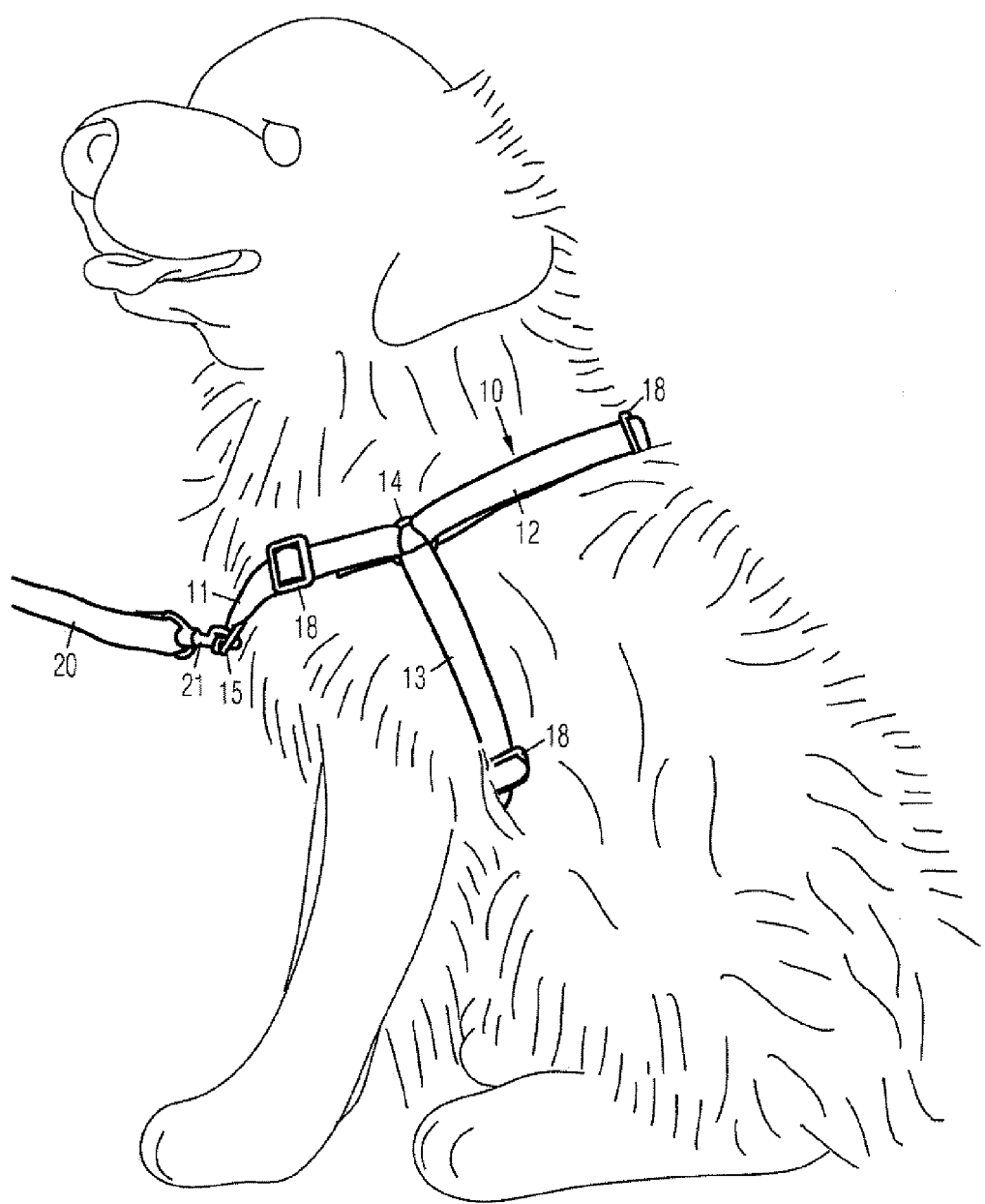
FIG. 3 is a side view of the invention on the animal.

In FIGS. 2 and 3, a harness (10) is shown worn on animal, which is a dog in this example. The harness (10) is most suitable for dogs, but it may be used for other four legged animals. A releasable connector (19) (FIG. 1) is disconnected for enabling the harness (10) to be put on the animal by sliding the chest strap (11) and the withers strap (12) down around its neck without lifting its legs. The releasable connector (19) is reconnected after the chest strap (11) and the withers strap (12) are in position. The chest strap (11) is positioned across the animal's chest, which is the portion between the tops of the front legs. The withers strap (12) is positioned across the withers, which is the portion between the shoulders behind the neck. The girth strap (13) is positioned across the girth, which is the portion on the underside behind the front legs. A leash (20) with a releasable connector (21) at the proximal end is connected to the leash connector (15) on the chest strap (11).

Length adjusters (18) on the straps (11-13) are adjusted to fit the animal. Side connectors (14) are generally positioned at the shoulders where the animal can easily feel them for receiving turning signals. The chest strap (11) is preferably adjusted to be loose enough for pivoting up and down about side connectors (14). The harness (10) is comfortable to wear because it may be worn relatively loosely, and because it does not rub the armpits or forearms like some prior art harnesses do. Accordingly, it allows the animal to walk freely without hobbling its movements.

Figure 4:
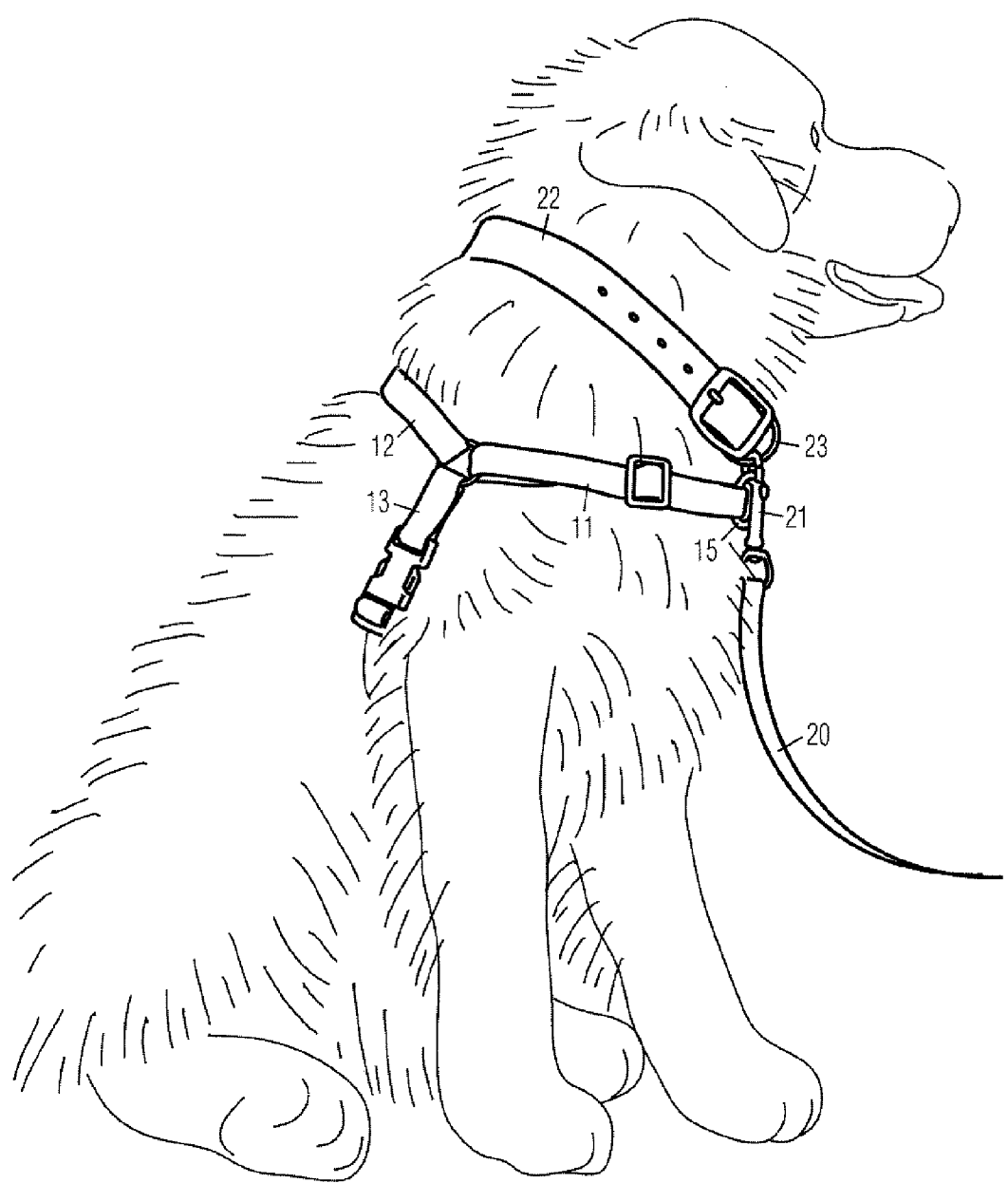
FIG. 4 is a side view of an alternative embodiment of the invention.

An alternative embodiment of the harness is shown in FIG. 4. It includes a collar (22) worn above a chest strap (11) and a withers strap (12). A leash connector (23) on collar (22) is connected to a leash connector (15) on the chest strap (11) by releasable connector (21) on the leash. The collar (22) provides additional control and signaling, as well as enabling an easier transition for an animal owner who is accustomed to using a collar alone. When the owner is familiar with using the harness, the collar (22) may be removed.

Figure 5:
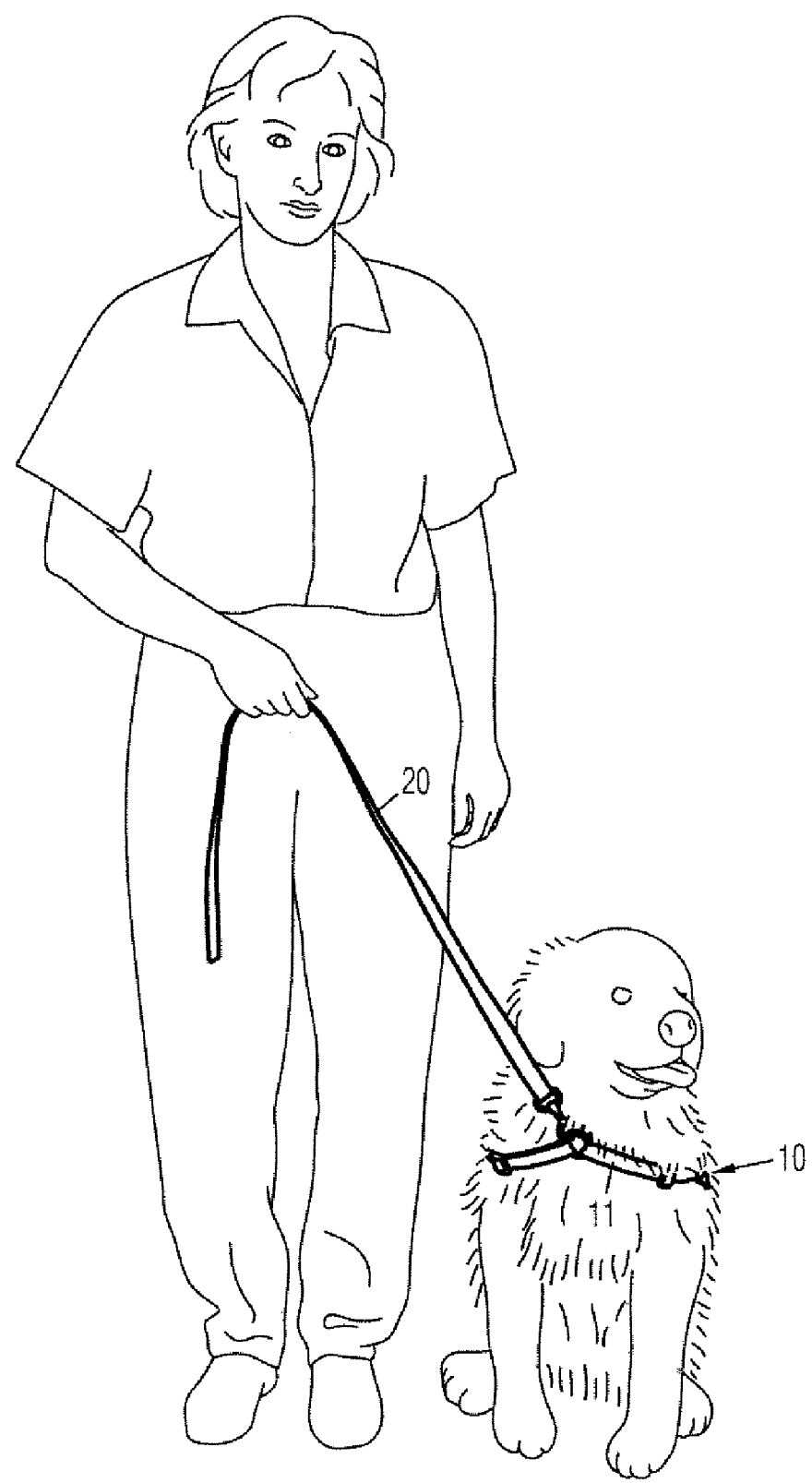
FIG. 5 is a front view of the invention when the animal is being instructed to proceed forward.
Figure 6:
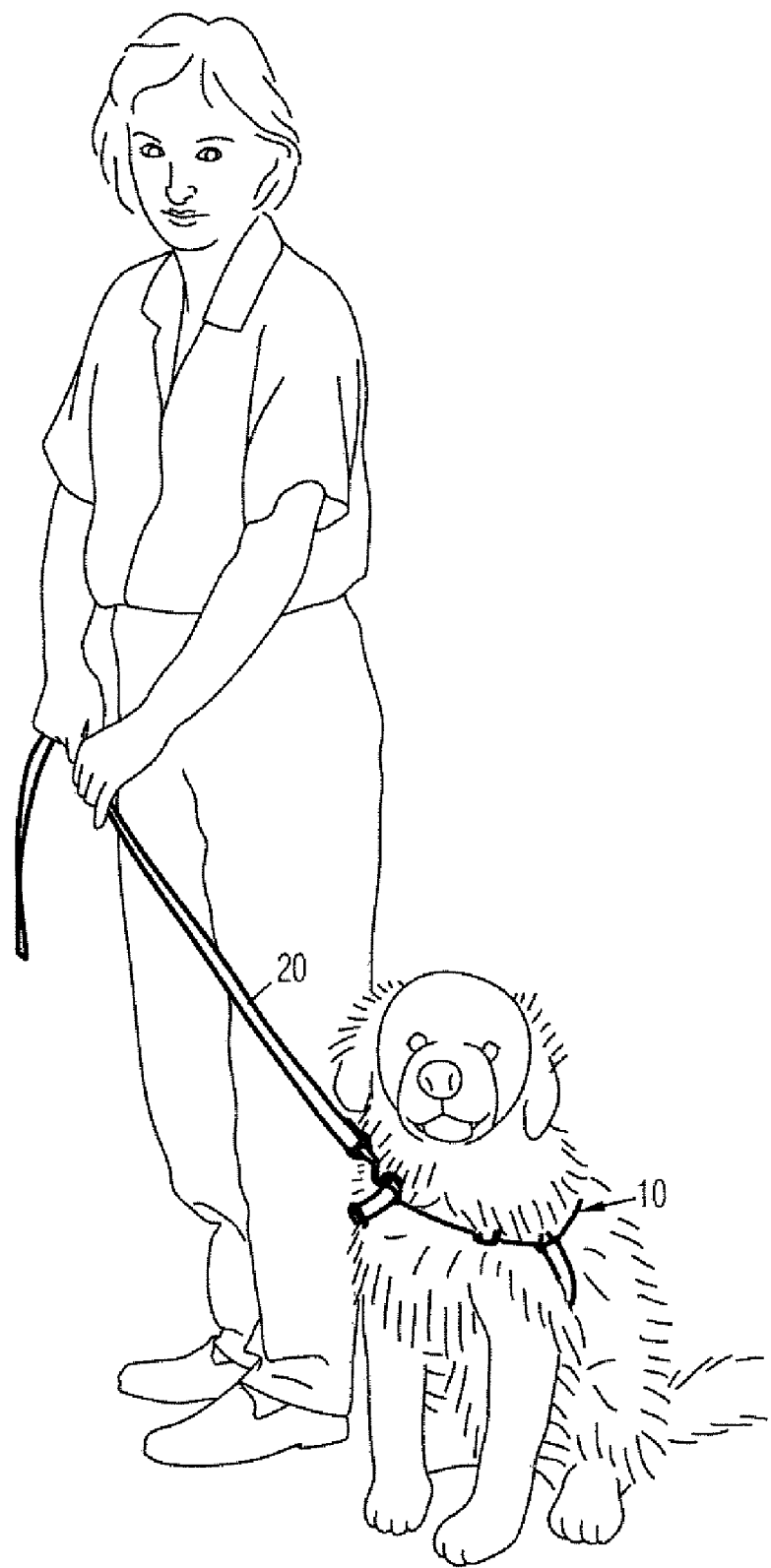
FIG. 6 is a front view the invention when the animal is being instructed to turn right.
Figure 7:
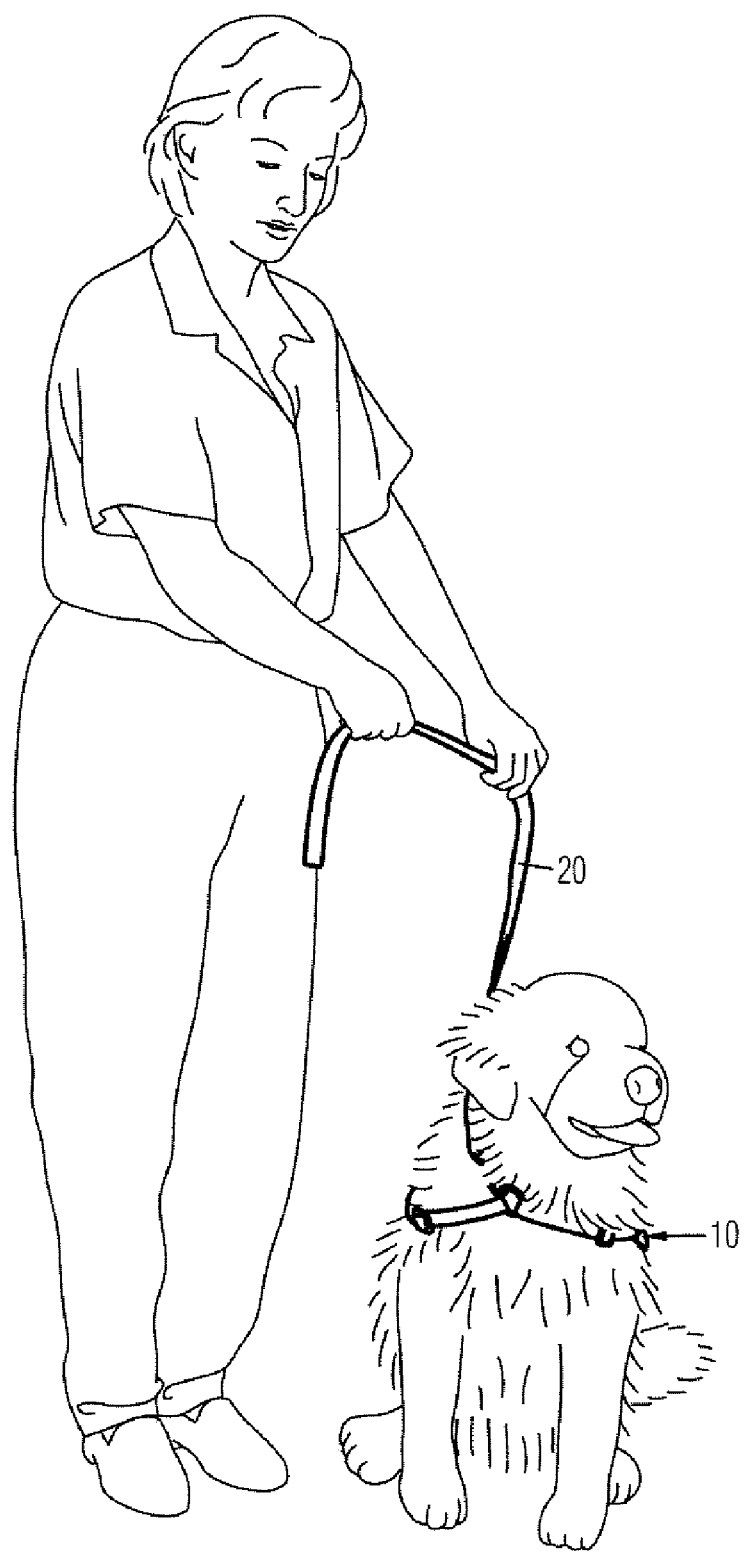
FIG. 7 is a front view invention when the animal is being instructed to turn left.

A method for training the animal wearing a harness (10) is shown in FIGS. 5-7. As an example, a trainer is shown on the right of the animal, but the trainer may be on the left instead.

In FIG. 5, the animal is instructed to proceed forward by pulling a leash (20) forward to apply pressure on the animal's withers and girth. If the animal moves forwards of the trainer and pulls the leash (20) taut, the leash connector (15) (FIG. 1) and the leash (20) apply a force to the sides and shoulders of the animal to produce a rotational effect on the animal since the leash connector (15) and the leash (20) are attached to the chest strap (11). The animal is signaled to turn toward the trainer and stopped from pulling on the leash (20).

The harness (10) eliminates the signals that prior art leashes and harnesses provide to cause the animal to pull on the leash (20). The animal will quickly learn to walk with the trainer instead of forcing its way ahead and pulling on the leash (20). The animal is instructed to sit or to stop walking by pulling the leash (20) upward to apply pressure on the animal's girth.

In FIG. 6, the animal is instructed to turn right by pulling the leash (20) to the right to apply pressure to the animal's left shoulder. In FIG. 7, the animal is instructed to turn left by pulling the leash (20) to the left to apply pressure to the right side of the animal's neck. If the animal is on the trainer's right side, the animal is instructed to turn right by pulling the leash (20) to the right to apply pressure to the left side of the animal's neck.

Although the above description is specific, they should not be considered as limitations on the scope of the invention, but only as examples of the embodiments. Many substitutes and variations are possible within the teachings of the invention. For example, the harness may be used with a collar or without the leash by grabbing the chest strap and pulling it in the appropriate direction. A collar may be considered as being comprised of a chest strap and a withers strap. The buckles may be replaced with hook-and-loop fasteners. A different harness may be provided for securing the leash connector at the chest of the animal. Therefore, the scope of the invention should be determined by the appended claims and their legal equivalents, not by the examples given.

I claim:

1. An animal training apparatus, comprising:
   a. a forechest strap for positioning across a forechest of an animal across its shoulders;
   b. a back strap for positioning across a back of the animal at or behind its shoulders;
   c. a girth strap for positioning across a girth of the animal behind the front legs on an underside thereof, wherein respective opposite ends of the forechest strap, the back strap, and the girth strap are connected together on each side of the two sides of the animal and the straps are of such relative length so as to place the two side connections at or behind the shoulders of the animal; and
   d. a leash connector attached to an intermediate position of the forechest strap for applying a rotational force to the shoulders of the animal when the animal moves forwards of a handler and pulls on the leash connector, wherein the forechest strap is comprised of a left strap and a right strap connected by the leash connector.

2. The animal training apparatus of claim 1, further including side connectors connecting adjacent ends of the forechest strap, the back strap, and the girth strap, wherein the side connectors can be positioned at or behind the shoulders of the animal.

3. The animal training apparatus of claim 1, further including a releasable connector along the girth strap that allows the girth strap to be opened and thus allows the harness to be worn around the animal without lifting the front legs.

4. An animal training apparatus, comprising:
   a. a forechest strap for positioning across a forechest of an animal across its shoulders;
   b. a back strap for positioning across a back of the animal at or behind its shoulders;
   c. a girth strap for positioning across a girth of the animal behind the front legs on an underside thereof, wherein respective opposite ends of the forechest strap, the back strap, and the girth strap are connected together on each side of the two sides of the animal and the straps are of such relative length so as to place the two side connections at or behind the shoulders of the animal;
   d. respective length adjusters on the back strap and the girth strap; and
   e. a leash connector attached to an intermediate position of the forechest strap for applying a rotational force to the shoulders of the animal when the animal moves forwards of a handler and pulls on the leash connector.

5. An animal training apparatus, comprising:
a. a harness, the harness comprising:
b. a back strap that can be positioned across an animal's back at or behind its shoulders;
c. a girth strap that can be positioned under the animal's girth, immediately behind its front legs;
d. a forechest strap that can be positioned around the animal's forechest across its shoulders,
wherein the back strap, the girth strap, and the forechest strap are connected together on each side of the animal, the forechest strap designed so as to be able to move up and down as a result of pivoting connections between the back strap, the girth strap, and the forechest strap, and
wherein the back strap, the girth strap, and the forechest strap are of relative length so as to position the side connections on each side of the animal at or behind the shoulders; and
e. a leash connector attached to an intermediate position on the forechest strap that allows for the controlling and training of the animal by pulling the forechest portion of the strap and thereby selectively applying pressure behind the animal's shoulders, under the girth, and over the back.

6. An animal training apparatus, comprising:
a. a harness, the harness comprising:
b. a back strap that can be positioned across an animal's back at or behind its shoulders;
c. a girth strap that can be positioned under the animal's girth, immediately behind its front legs;
d. a forechest strap that can be positioned around the animal's forechest across its shoulders wherein the back strap, the girth strap, and the forechest strap are connected together on each side of the animal;
e. respective length adjusters on the back strap and the girth strap so as to allow the adjustment of the side connections at or behind the animal's shoulders, wherein the back strap, the girth strap, and the forechest strap are of relative length so as to position the side connections on each side of the animal at or behind the shoulders; and
f. a leash connector attached to an intermediate position on the forechest strap that allows for the controlling and training of the animal by pulling the forechest portion of the strap and thereby selectively applying pressure behind the animal's shoulders, under the girth, and over the back.

7. An animal training apparatus, comprising:
a. a forechest strap that can be positioned across a forechest of an animal across its shoulders;
b. a back strap that can be positioned across a back of the animal at or behind its shoulders;
c. a girth strap that can be positioned across a girth of the animal behind the front legs on an underside, wherein respective opposite ends of the forechest strap, the back strap, and the girth strap are connected together; and
d. a leash connector attached to an intermediate position on the forechest strap that allows for the controlling and training of the animal by pulling the forechest portion of the strap and thereby selectively applying pressure behind the animal's shoulders, under the girth, and over the back, wherein the forechest strap comprises a left strap and a right strap connected by the leash connector.

8. The animal training apparatus of claim 7, further including a leash connected to the leash connector.

9. The animal training apparatus of claim 7, further including side connectors connecting adjacent ends of the forechest strap, the back strap, and the girth strap, wherein the side connectors are for being positioned at or behind the shoulders of the animal.

10. The animal training apparatus of claim 7, further including a releasable connector along the girth strap to enable the girth strap to be opened and thus enable the harness to be worn around the animal without lifting the front legs.

11. The animal training apparatus of claim 7, wherein the back strap, the girth strap, and the forechest strap are of relative length so as to position the connections on each side of the animal at or behind its shoulders.

12. The animal training apparatus of claim 7, wherein the lengths of the back strap, the girth strap, and the forechest strap are adjustable so as to be able to position the connections on each side of the animal at or behind its shoulders.

13. An animal training apparatus, comprising:
a. a forechest strap that can be positioned across a forechest of an animal across its shoulders;
b. a back strap that can be positioned across a back of the animal at or behind its shoulders;
c. a girth strap that can be positioned across a girth of the animal behind the front legs on an underside, wherein respective opposite ends of the forechest strap, the back strap, and the girth strap are connected together;
d. respective length adjusters on the back strap and the girth strap; and
e. a leash connector attached to an intermediate position on the forechest strap that allows for the controlling and training of the animal by pulling the forechest portion of the strap and thereby selectively applying pressure behind the animal's shoulders, under the girth, and over the back.

14. An animal training apparatus, comprising:
a. a forechest strap that can be positioned across a forechest of an animal between tops of front legs thereof;
b. a back strap that can be positioned across a back of the animal behind a neck and between shoulders thereof;
c. a girth strap that can be positioned across a girth of the animal behind the front legs on an underside thereof, wherein respective opposite ends of the forechest strap, the back strap, and the girth strap are connected together;
d. side connectors connecting adjacent ends of the forechest strap, the back strap, and the girth strap, wherein the side connectors can be positioned at the shoulders of the animal, wherein the side connectors comprise rings that enable the forechest strap to pivot up and down; and
e. a leash connector attached to an intermediate position on the forechest strap that can transmit a rotational force to the animal when the animal moves in front of a handler and pulls on the leash connector, thus preventing the animal from pulling further.

15. The animal training apparatus of claim 14, further comprising a leash connected to the leash connector.

16. An animal training apparatus, comprising:
a. a forechest strap for positioning across a forechest of an animal across its shoulders;
b. a back strap for positioning across a back of the animal at or behind its shoulders;
c. a girth strap for positioning across a girth of the animal behind the front legs on an underside thereof, wherein respective opposite ends of the forechest strap, the back strap, and the girth strap are connected together on each side of the two sides of the animal and the straps are of such relative length so as to place the two side connections at or behind the shoulders of the animal; and d. a leash connector attached to an intermediate position of the forechest strap for applying a rotational force to the shoulders of the animal when the animal moves forwards of a handler and pulls on the leash connector, wherein the leash connector includes a ring.

17. An animal training apparatus, comprising:

a. a forechest strap for positioning across a forechest of an animal across its shoulders;

b. a back strap for positioning across a back of the animal at or behind its shoulders;

c. a girth strap for positioning across a girth of the animal behind the front legs on an underside thereof, wherein respective opposite ends of the forechest strap, the back strap, and the girth strap are connected together on each side of the two sides of the animal and the straps are of such relative length so as to place the two side connections at or behind the shoulders of the animal; and d. a leash connector attached to an intermediate position of the forechest strap for applying a rotational force to the shoulders of the animal when the animal moves forwards of a handler and pulls on the leash connector, wherein the leash connector includes a cord.

18. An animal training apparatus, comprising:

a. a forechest strap for positioning across a forechest of an animal across its shoulders, wherein the forechest strap is comprised of a left strap and a right strap, lengths of the left strap and the right strap being independently adjustable;

b. a back strap for positioning across a back of the animal at or behind its shoulders;

c. a girth strap for positioning across a girth of the animal behind the front legs on an underside thereof, wherein respective opposite ends of the forechest strap, the back strap, and the girth strap are connected together on each side of the two sides of the animal and the straps are of such relative length so as to place the two side connections at or behind the shoulders of the animal; and d. a leash connector attached to an intermediate position of the forechest strap for applying a rotational force to the shoulders of the animal when the animal moves forwards of a handler and pulls on the leash connector.

19. An animal training apparatus, comprising:

a. a harness, the harness comprising:

b. a back strap that can be positioned across an animal's back at or behind its shoulders:

c. a girth strap that can be positioned under the animal's girth, immediately behind its front legs;

d. a forechest strap that can be positioned around the animal's forechest across its shoulders, wherein the back strap, the girth strap, and the forechest strap are connected together on each side of the animal, and wherein the back strap, the girth strap, and the forechest strap are of relative length so as to position the side connections on each side of the animal at or behind the shoulders; and e. a leash connector attached to an intermediate position on the forechest strap that allows for the controlling and training of the animal by pulling the forechest portion of the strap and thereby selectively applying pressure behind the animal's shoulders, under the girth, and over the back, wherein the leash connector is configured to prevent the leash connector from shifting to the back of the animal.

20. An animal training apparatus, comprising:

a. a harness, the harness comprising:

b. a back strap that can be positioned across an animal's back at or behind its shoulders;

c. a girth strap that can be positioned under the animal's girth, immediately behind its front legs;

d. a forechest strap that can be positioned around the animal's forechest across its shoulders, wherein the back strap, the girth strap, and the forechest strap are connected together on each side of the animal, wherein the back strap, the girth strap, and the forechest strap are of relative length so as to position the side connections on each side of the animal at or behind the shoulders, and wherein the side connections include a ring; and e. a leash connector attached to an intermediate position on the forechest strap that allows for the controlling and training of the animal by pulling the forechest portion of the strap and thereby selectively applying pressure behind the animal's shoulders, under the girth, and over the back.

21. An animal training apparatus, comprising:

a forechest strap configured to be positioned across a forechest of an animal;

a back strap configured to be positioned across a back of the animal;

a girth strap configured to be positioned across a girth of the animal between a front leg and a back leg, respective ends of the forechest strap, the back strap, and the girth strap being coupled together;

a back strap length adjustor configured to adjust a length of the back strap and a girth strap length adjustor configured to adjust a length of the girth strap while maintaining a total length of the back strap and the girth strap; and a leash connector attached to the forechest strap and configured to control the animal by pulling the forechest strap.

22. The animal training apparatus of claim 21, wherein the respective ends of the forechest strap, the back strap, and the girth strap are coupled together using rings that enable the forechest strap to pivot up and down.

23. An animal training apparatus, comprising:

a forechest strap configured to be positioned across a forechest of an animal;

a back strap configured to be positioned across a back of the animal;

a girth strap configured to be positioned across a girth of the animal between a front leg and a back leg, respective ends of the forechest strap, the back strap, and the girth strap being coupled together;

a leash connector coupled to the forechest strap and configured to control the animal by pulling the forechest strap; and one or more forechest strap length adjustors configured to change a position of the leash connector on the forechest strap while maintaining a total length of the forechest strap.

24. The animal training apparatus of claim 23, wherein the respective ends of the forechest strap, the back strap, and the girth strap are coupled together such that the forechest strap can pivot up and down.

25. The apparatus of claim 23, wherein the leash connector includes a ring.

26. An animal training apparatus, comprising:
a. a forechest strap for positioning across a forechest of an animal across its shoulders;
b. a back strap for positioning across a back of the animal at or behind its shoulders;
c. a girth strap for positioning across a girth of the animal behind the front legs on an underside thereof, wherein respective opposite ends of the forechest strap, the back strap, and the girth strap are connected together on each side of the two sides of the animal and the straps are of such relative length so as to place the two side connections at or behind the shoulders of the animal;
d. a leash connector attached to an intermediate position of the forechest strap for applying a rotational force to the shoulders of the animal when the animal moves forwards of a handler and pulls on the leash connector; and
e. a cord attached to the leash connector.

27. An apparatus comprising:
a forechest strap configured to extend from a first connection to a second connection and to be positioned across a chest of an animal between a neck and front legs of the animal;
a withers strap configured to extend from the first connection to the second connection and to be positioned across a withers of the animal behind the neck of the animal;
a girth strap configured to extend from the first connection to the second connection and to be positioned across a girth of the animal behind the front legs of the animal, the first and second connections being vertically adjustable by independently changing lengths of both the withers strap and the girth strap,
the first and second connections being horizontally adjustable by changing a length of the forechest strap; and
a leash connector operatively coupled to the forechest strap and configured to connect a leash to the forechest strap.

28. The apparatus of claim 27, wherein the first connection is proximate a first shoulder of the animal and the second connection is proximate a second shoulder of the animal.

29. The apparatus of claim 27, wherein the first connection is at or behind a first shoulder of the animal and the second connection is at or behind a second shoulder of the animal.

30. The apparatus of claim 27, wherein a position of the leash connector on the forechest strap is adjustable.

31. The apparatus of claim 27, wherein the leash connector includes a ring.

32. The apparatus of claim 27, wherein the leash connector includes a cord.

33. The apparatus of claim 27, wherein the leash connector is configured to be prevented from shifting towards the back of the animal.

34. The apparatus of claim 27, wherein the first and second connections each include a ring.

35. The apparatus of claim 27, further comprising a girth strap length adjustor configured to adjust the length of the girth strap between the first and second connections and a withers strap length adjustor configured to adjust the length of the withers strap between the first and second connections.

36. The apparatus of claim 27, wherein the first and second connections are vertically adjustable while maintaining a total length of the withers strap and the girth strap.

37. The apparatus of claim 27, further comprising a first forechest strap length adjustor configured to adjust a length of the forechest strap between the leash connector and the first connection.

38. The apparatus of claim 37, further comprising a second forechest strap length adjustor configured to adjust a length of the forechest strap between the leash connector and the second connection.

39. The apparatus of claim 27, further comprising one or more forechest strap length adjustors configured to adjust a position of the leash connector on the animal while maintaining the length of the forechest strap.

40. The apparatus of claim 27, wherein the withers strap and the girth strap are integrally connected to each other.

41. The apparatus of claim 27, further including a length adjustor configured for adjusting a length of the forechest strap, the length adjustor being separate from the leash connector.

42. The apparatus of claim 27, wherein ends of the forechest strap, the withers strap, and the girth strap are connected together without a connector.

43. The apparatus of claim 27, wherein the first connection is configured such that the forechest strap can pivot up and down.

44. An apparatus, comprising:
a forechest strap including a first end and a second end, the forechest strap configured to be positioned across a forechest of an animal between a neck and front legs of the animal;
a back strap including a first end and a second end, the back strap configured to be positioned across a back of the animal behind the neck of the animal;
a girth strap including a first end and a second end, the girth strap configured to be positioned across a girth of the animal behind the front legs of the animal;
a first connector configured to couple the first end of the forechest strap, the first end of the back strap, and the first end of the girth strap;
a second connector configured to couple the second end of the forechest strap, the second end of the back strap, and the second end of the girth strap;
a leash connector coupled to the forechest strap between the first end of the forechest strap and the second end of the forechest strap; and
a forechest strap length adjustor separate from the leash connector and configured for adjusting a length of the forechest strap.

45. The apparatus of claim 44, wherein the first connector includes a ring configured such that the forechest strap can pivot up and down.

* * * * *